Figure 1:
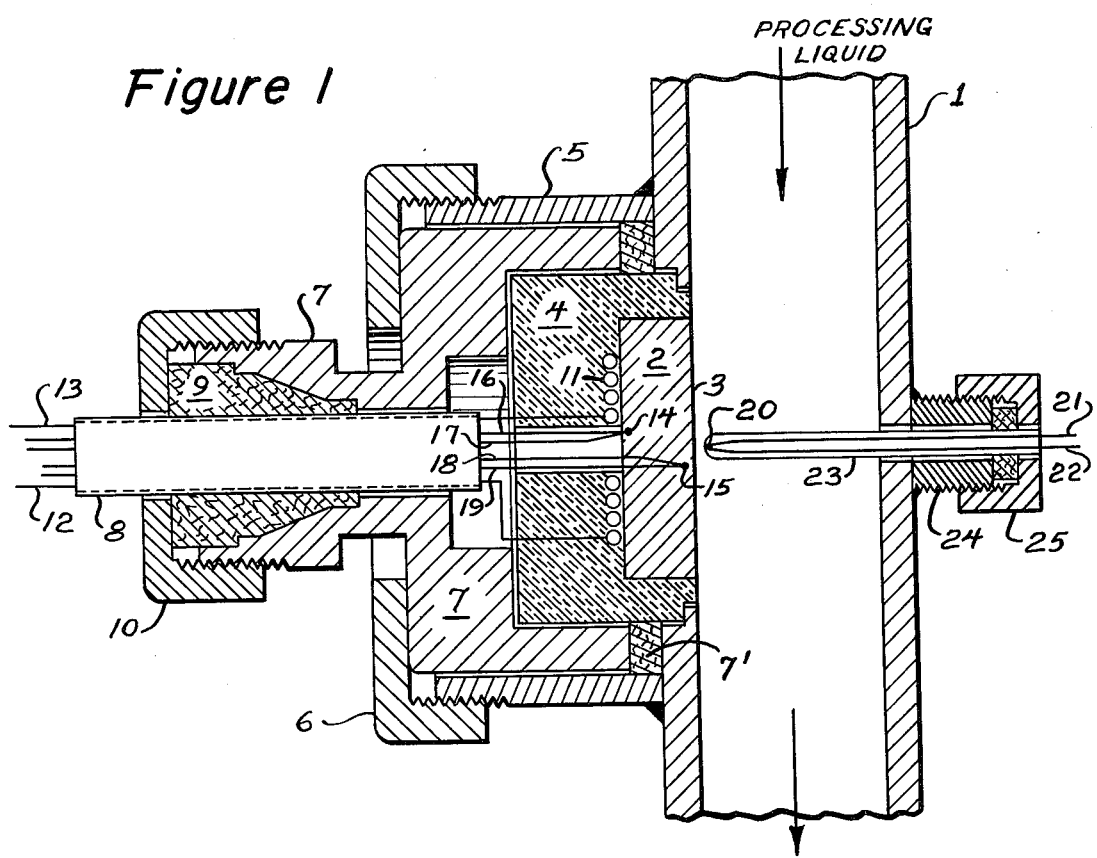

United States Patent [19]
Hausler

[11] 3,913,378
[45] Oct. 21, 1975

[54] APPARATUS FOR MEASURING FOULING ON METAL SURFACES

[75] Inventor: Rudolf H. Hausler, Palatine, Ill.

[73] Assignee: Universal Oil Products Company, Des Plaines, Ill.

[22] Filed: Apr. 8, 1974

[21] Appl. No.: 459,252

[52] U.S. Cl. .................................. 73/15 R; 73/61.2
[51] Int. Cl.² ........................................ G01N 25/00
[58] Field of Search ........ 73/15 R, 15 A, 15.4, 61.2, 73/190 R, 190 H

[56] References Cited
UNITED STATES PATENTS

| | | | |
|---|---|---|---|
| 3,075,377 | 1/1963 | Lang | 73/15 |
| 3,229,499 | 1/1966 | Shayeson et al. | 73/15 |
| 3,238,775 | 3/1966 | Watts | 73/15 |
| 3,605,490 | 9/1971 | Progelhol et al. | 73/190 |

FOREIGN PATENTS OR APPLICATIONS

| | | | |
|---|---|---|---|
| 183,436 | 8/1966 | U.S.S.R. | 73/15 |
| 238,829 | 7/1969 | U.S.S.R. | 73/15 |
| 147,009 | 9/1962 | U.S.S.R. | 73/15 |

Primary Examiner—Herbert Goldstein
Attorney, Agent, or Firm—James R. Hoatson, Jr.; Philip T. Liggett; William H. Page, II

[57] ABSTRACT

The measurement of material buildup, or fouling, on a metal surface from a liquid flow is provided by effecting a temperature differential measurement of heat conductivity through a heated conductive metal piece that is mounted to have one surface exposed to the liquid flow, while having the remaining portion thermally insulated from surrounding conditions, and then dividing such measurement with a temperature differential measurement for the liquid receiving convected heat across the zone of the interface between the surface of the metal piece and the flowing liquid. A preferred system provides for positioning thermocouple means to give a voltage signal of the temperature differential reading through the depth of the metal piece and another voltage signal indication of the temperature differential across the interface between the metal and the liquid and then feeding such signals into a voltage divider means to effect a voltage ratio reading that is indicative of material buildup on the metal surface.

4 Claims, 2 Drawing Figures

U.S. Patent    Oct. 21, 1975    3,913,378

APPARATUS FOR MEASURING FOULING ON METAL SURFACES

The present invention relates to a method and means for electrically and automatically measuring the fouling of a metal surface from a fluid stream.

More specifically, the invention is directed to a system for measuring a fouling rate from a liquid stream by the utilization of thermocouples to provide a voltage signal of the temperature differential through the thickness of a heated and insulated metal piece having one surface exposed to the liquid flow and another voltage signal indicative of the heat convected from the metal piece into the liquid adjacent the interface with the liquid and the metal surface and then determining material buildup on the metal surface as a varying output from a divider circuit which in turn provides for the dividing of one signal by the other.

Various types of procedures and test apparatus have been used to measure material buildup, or fouling, on a test specimen. For example, a test probe, such as an immersed wire, can be used in the manner of U.S. Pat. No. 3,731,187; where fouling is determined by a change in current or voltage resulting from a change in the heat transfer coefficient of the test specimen. While the heated wire type apparatus is of particular advantage in permitting a single measurement to be indicative of heat transfer coefficient and of progressive fouling, there is a disadvantage in being able to use certain alloy metals. For example, in a situation where the surface to be fouled is of a stainless steel, as for example, 304 stainless with a low $\alpha$ (with $\alpha$ being the temperature coefficient of resistance), then only the most severe foulings will provide proportional electrical signals. In other words, with pure metals having reasonably high $\alpha$ values there is no problem with the heated wire probe test procedure for fouling rate measurements, but with alloys having small $\alpha$ values there is a need of a different system to get proportionality and accuracy of measurements.

Thus, it may be considered a principal object of the present invention to provide a fouling measurement system which can be utilized to determine material buildup on alloy surfaces, as well as on pure metals.

Another object of the present invention is to provide a fouling rate measurement system where a single resulting voltage reading can be indicative of a decrease in heat flux from a heated metal surface to the adjacent liquid flow.

As a particular feature and as still another object of the invention, there is provided a fouling measurement system which makes use of thermocouple means to measure temperature differential ($\Delta T_m$) through a heated metal piece having one surface thereof exposed to processing liquid flow, additional thermocouple means to measure heat transfer ($\Delta T_{pl}$) from the metal surface to the liquid flow adjacent the interface therebetween, and a divider circuit ar0angement to provide a resultant output (V) where the reading varies with the ratio of $$\frac{\Delta T_m}{\Delta T_{pl}}$$

The aforenoted relationship can be set forth by noting that:

1. g (heat flux through a heated metal piece)

$$= k \cdot A \frac{\Delta T_m}{d}$$

where
$k$ = thermal conductivity of the metal
$A$ = area of the metal piece
$d$ = thickness of the metal piece
$\Delta T_m$ = temperature differential through the depth of the metal piece 2. g (convected heat transfer) = $hc \cdot A \cdot \Delta T_{pl}$ where
$hc$ = convective heat transfer coefficient
$A$ = metal piece area
$\Delta T_{pl}$ = temperature differential across the heat transfer face of the metal piece to the process liquid and from the equations (1) and (2) there is the resulting relationship:

$$hc = \frac{k}{d} \cdot \frac{\Delta T_m}{\Delta T_{pl}}$$

Thus, it can be further noted that the determination of heat transfer coefficient may be reduced to finding a readout for the temperature differential across the depth of the metal piece divided by the temperature differential across the heat transfer from the interface.

As briefly set forth and as will be explained more fully hereinafter, the temperature differential readings may be evaluated as electrical voltage signals and the desired ratio value obtained as a voltage output from a conventional multiplier/divider circuit. The output signal may also be modified in the circuit by a suitable constant for $k/d$, as indicated in the above equation (3).

Where a rate of fouling is desired, then the output value can be further determined as a function of time.

In a broad aspect, the present invention provides a method for measuring the fouling of the surface of a metal piece being exposed to a processing liquid stream by measuring a variation in the convective heat transfer coefficient with respect to heat flux from the metal piece to the processing stream, which comprises: (a) providing a constant heat input to an insulated metal piece having one surface maintained exposed to said liquid stream; (b) measuring temperature differential through the thickness of said piece and, in turn, determining the heat flux therethrough responsive to any variations in thermal conductivity; (c) measuring a temperature differential between the face of said piece and the liquid stream closely adjacent the interface therebetween; and (d) determining a measurement of the ratio between the temperature differentials of (b) and (c) as being indicative of the fouling of the metal surface.

It is not intended to limit the present invention for use with any one type of liquid or within any one type of equipment. The fouling measuring system may be used in connection with the processing side of a petroleum or of a chemical processing unit in order to determine the rate of fouling for a hydrocarbon type stream or for a particular type of processing stream in a chemical plant. For example, the system may be installed in or combined with heat exchange equipment, condensers, heaters or reboilers, etc., in order to determine the degree of material buildup on a metal surface within a particular piece of processing equipment or within a process pipe or conduit. Also, the system may be used to advantage for determining fouling in connection with cooling water streams used in the cooling side of a heat exchanger, condenser, or the like, as well as in water piping, storage vessels, etc. The system may also be used to advantage to provide a measure of the extent of corrosion as well as for fouling from material buildup on a particular metal surface.

As a still further advantage, the system may be used over a relatively wide range of temperatures as well as accommodate temperature fluctuations for a particular process stream being passed over the test surface. In other words, the system is capable of handling a wide range of temperatures and also taking care of temperature fluctuations by their being self-compensating within the electrical circuitry.

The metal piece being placed under test will, of course, be of the same material as the metal in the equipment or piping which will be subjected to fouling from the fluid stream. It is also preferable that the metal piece being used in the system, and having a surface exposed to the passing liquid, be well insulated from the adjacent portions of a pipe, tube, chamber wall, or whatever, in order to preclude heating or cooling effects from such adjacent metal. It is also desirable to have a constant heat input, such as by an electrical resistance heating coil in contact with the metal piece, and encompassed by the insulation which, in turn, is insulating and isolating the metal piece from the remaining portions of the pipe or processing apparatus. The heating coil can be connected to suitable constant voltage supply means to in turn insure constant heat input into the system such that there is the capability of a constant heat flux through the metal piece for convection heat transfer from the exposed surface.

It is not intended to limit the metal piece to any one size or shape inasmuch as it can vary to suit a particular placement condition and may, for example, have a curved surface to conform with the shell of a heat exchange chamber or the wall of a conduit, or the like. Normally, the area will comprise but a few square inches such that it may be readily mounted in any type of wall without taking up undue surface area in a measurement zone.

In another embodiment, the present invention provides an apparatus for measuring the fouling of a metal surface exposed to the flow of a liquid stream by providing for means for detecting an electrical signal responsive to the heat transfer taking place from a heated metal piece into a liquid stream passing over one face thereof and for dividing such signal into an electrical signal indicative of the differential temperature through the thickness of the metal piece, which comprises in combination: (a) means for mounting said metal piece to insulate it from ambient conditions while having one surface exposed to said stream; (b) means for providing a constant heat input into said metal piece; (c) means for measuring the temperature differential across the depth of said piece and providing an electrical output representative thereof; (d) means for measuring variations in temperature for the convected heat across the interface between the liquid and the exposed surface of said metal piece and for generating an electrical output therefrom indicative of the temperature being measured; (e) electrical divider circuit means for receiving the measurements of (c) and (d) and for reading out a resulting electrical signal indicative of changes in the ratio between the metal piece temperature differential and the temperature differential across the interface between the metal piece and the liquid flow to, in turn, provide a measurement of the fouling of the exposed metal surface.

As heretofore noted, a preferred means for effecting the temperature differential measurements is accomplished through the positioning of thermocouples into or onto the metal piece so as to obtain a temperature differential through the depth of the piece in order to, in turn, provide a measure of the heat flux therethrough. One or more additional thermocouple means may be positioned a short space distance from the exposed surface of the metal piece within the liquid which flows over the exposed surface of the test piece such that there may be a measurement of temperature from convected heat from the interface of the metal piece. The thermocouple means in the liquid is also connected with the thermocouple means connecting to the metal piece in a manner to effect temperature compensation for the latter for any changes in liquid temperature as well as to provide a voltage signal responsive to the differential between the face of the metal piece and the adjacent thermocouple in the flowing liquid. The electrical signal indicating the temperature differential through the metal piece is utilized as one input into a conventional divider circuit means and the temperature differential for the convected heat transfer to the thermocouple in the liquid provides another input to the divider circuit such that the voltage output from the divider circuit will vary in accordance with the ratio between the aforesaid temperature differential signals. In other words, as the temperature differentials from the thermocouple signals vary over a period of time due to material buildup on the surface of the metal piece, there will be a corresponding change in the input signals and in the output signal. The latter can, in turn, be calibrated to provide a measurement of the amount of material buildup on a particular metal piece.

In a preferred arrangement, a third voltage input may be provided for the circuit readout means to accommodate the constant $k/d$ (as defined in connection with equation (1) and resulting in a modification of the convective heat transfer coefficient occurring in equation (3)). This $k/d$ input may be provided to a multiplier/divider circuit as a gain factor such that there is a resulting modification of the ratio $$\frac{\Delta T_m}{\Delta T_{pl}}$$

by the $k/d$ factor. In other words, the multiplier/divider circuit is providing a multiplication of the $k/d$ factor and the $\Delta T_m$ while being divided by the $\Delta T_{pl}$ signal.

Reference to the accompanying drawing and the following description thereof will serve to better illustrate how an embodiment of the present invention may be utilized to measure fouling with respect to a processing stream as well as illustrate the method of effecting an automatic measurement of fouling through the use of thermocouple means in an electronic circuit integrating conventional multiplier/divider circuit means.

FIG. 1 of the drawing is a diagrammatic sectional elevational view through a simplified fouling measurement system as installed in connection with a process fluid conduit means.

Figure 2:
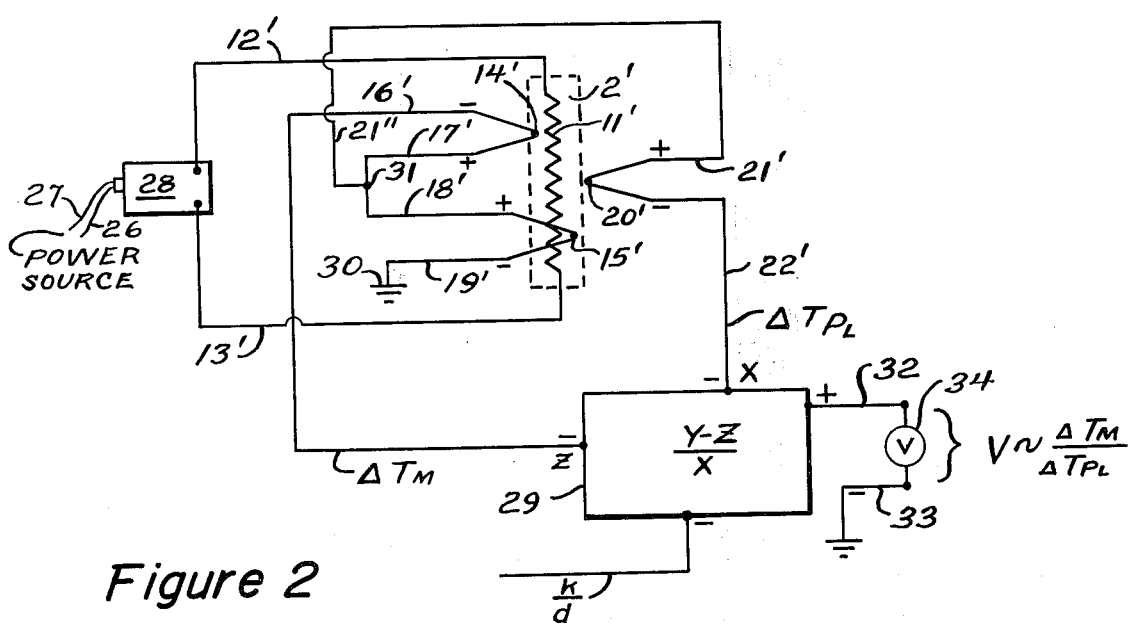

FIG. 2 of the drawing shows a diagrammatic electrical circuit that, in turn, is indicating the automatic measurement of fouling as a voltage output from a conventional multiplier/divider circuitry means.

Referring now to FIG. 1 of the drawing there is indicated a metal conduit 1 adapted to accommodate a processing liquid flow therethrough which can cause a material buildup on the inside wall thereof and on a test piece 2. In accordance with the present invention, the metal test piece 2, will have a composition substantially the same as the wall for conduit 1 and will be positioned along the side of the conduit in a manner to have a surface 3 exposed to the processing fluid passing thereover. The test piece 2 is insulated and in effect isolated from the rest of the wall portion of conduit 1 in order that it not be effected by ambient temperatures or conducted heat from the surrounding conduit wall. Thus, there is indicated insulating material 4 as suitably encompassing the sides and back portion of the metal piece 2 in order to effect its separation from the adjacent portions of conduit 1.

Actually, various methods may be utilized to effect the removable positioning of the test piece 2 within a side wall portion of a conduit or apparatus to which the test specimen is to be mounted in the electronic test system utilized; however, in the present instance, there is an encompassing housing section 5 with a threaded exterior end portion to engage an internally threaded removable cap member 6 that also encompasses and engages a holding member 7. The latter is sized to encompass and press against the exterior wall portions of insulation 4 which, in turn, surrounds metal piece 2 so that the latter will be held in place within the side of conduit 1. The wide portion of member 7 which surrounds the insulation 4 has its end abut against a seal ring 7' so as to maintain a pressure tight seal around the combination of metal piece 2 and insulation 4. Holding member 7 is also provided with an internal axially positioned tubular member 8 adapted to accommodate the various wires for a heating coil and the thermocouple means being used in combination with the metal piece 2. The tubular member 8 is indicated as being held in place within holding member 7 by suitable internal packing means 9 and pressure applying cap means 10. It is, however, not intended to limit the mechanical means for holding the insulation 4 and metal piece 2, as well as the wire holding tube means 8 to the type of construction and arrangement shown inasmuch as many conventional pressure tight holding means may well be used within the scope of the present invention.

In accordance with the present test system, a heat supply means with a constant heat input is provided for the test piece and heat emitting surface, such as electrical resistance coil 11 having electrical supply lines 12 and 13, which is shown as being adjacent the back side of metal piece 2 and buried within the insulation 4. Typically, lines 12 and 13 will be connective to a suitable battery means or constant voltage transformer means 28 such that there is a constant power input to the heating coil 11 and to the surface of metal piece 2. Coil 11 will comprise an electrical resistance coil with sufficient resistance to supply the desired heat input into a particular testing system and such resistance wire may be coated to preclude an electrically conductive contact with metal piece 2. On the other hand, where a suitable electric current insulating sheet is placed between the coils 11 and the metal surface of 2, then spaced bare resistance wire may be positioned between the insulation 4 and the back side of metal piece 2.

Also passing through tubular means 8 and insulation 4 to provide contact with metal piece 2 are thermocouples or suitable wire means which connect with spaced thermocouple means such as 14 and 15. The thermocouple 14 has wiring 16 and 17 leading therefrom at the backside of metal piece 2, away from the interface with liquid flow in conduit 1, while wires 18 and 19 are connective with the thermocouple juncture 15 which is adjacent the exposed surface of metal piece 2 adjacent the interface with the liquid flow in conduit 1. Thus, as will be described with respect to FIG. 2, by the series connection of wires from thermocouples 14 and 15 such that there is a common metal juncture between the two thermocouples there may be a resulting temperature differential signal provided to be supplied as an input to a multiplier/divider circuit.

In accordance with the present invention, there is also provided a thermocouple juncture 20, with connecting wires 21 and 22, that is positioned to be within the processing liquid flow at a point closely adjacent the exposed surface 3 of metal piece 2 such that the juncture 20 can be responsive to convective heat from the surface 3. Also, as will be more fully set forth in connection with FIG. 2 of the drawing, a similar metal wire from thermocouple 20 is connected to the wiring juncture from interconnected thermocouples 14 and 15 while the other of the wires of thermocouple 20 provides an electrical voltage signal that will be indicative of the temperature reading at 20 responsive to convective heat flux from the interface 3. At the same time, the interconnection of the thermocouples will provide for compensating voltage output from the thermocouples responsive to any fluctuations in temperature for the processing liquid passing through conduit 1. In the present embodiment, the thermocouple 20 is also indicated as being held within a shield means 23 such that it may be readily inserted into the conduit 1 through a suitable opening in the latter and through threaded bushing means 24 as well as through suitable threaded cap means 25 adapted to engage the bushing 24 for a removable mounting arrangement. Generally, a single thermocouple, such as 20, is sufficient to measure convective heat transfer from the heated metal piece 2; however, where deemed desirable, a plurality of interconnective thermocouples may be positioned opposite the interface 3 in order to obtain an averaged heat transfer from the face 3 for metal piece 2.

Referring now particularly to FIG. 2 of the drawing, there is indicated by dashed lines 2' a diagrammatic illustration of a heated and insulated metal piece equivalent to 2 of FIG. 1 of the drawing. One face thereof is exposed to the liquid flow and as a result is being subjected to material buildup and/or corrosion from the effects of the particular liquid stream. There is also indicated the positioning of a resistance coil 11', with supply wires 12' and 13', such that there may be a constant heat input into the metal piece 2' in the same manner that electrical resistance coil 11 provides a constant heat input to the surface of metal piece 2 in FIG. 1 of the drawing. In the present diagram there is indicated a power source from lines 26 and 27 connective with a constant voltage transformer means 28 such that there is a constant voltage input from lines 12' and 13' into the heating coil 11'. Also associated with the metal piece 2' are the spaced thermocouples 14' and 15' such as to provide an electrical voltage signal which can be indicative of the temperature differential through the depth of metal piece 2' and provide an electrical input signal therefrom to the multiplier/divider circuit at 29. Specifically, one of the wires, such as 17' from thermocouple 14', is connected at a juncture 31 with a similar metal lead line, such as 18', from thermocouple 15' whereby there is a compensating effect between the voltage outputs from the respective thermocouples 14' and 15' and a resulting differential voltage signal ($\Delta T_m$) carried through line 16' to input terminal Z at multiplier/divider 29. Line 19' from thermocouple 15' is indicated as being grounded at 30.

For the thermocouple 20', which is placed closely adjacent the exposed surface of the metal piece 2' (in the manner of thermocouple juncture 20 in FIG. 1) there is provided a line 21' made connective to the juncture 31 which is made between lines 17' and 18' of similar metals, as for example the constantan metal of an iron-constantan thermocouple. The lead wire 21' is also made connective with the constantan portion of thermocouple 20'. At the same time the lead wire 22' from the other metal portion of thermocouple 2' is made connective with terminal X at the multiplier/divider circuitry means 29. The result of the present arrangement is such that thermocouple 20' will operate to provide a voltage signal indicative of the differential temperature ($\Delta T_{pl}$) showing heat transfer from the exposed surface of metal piece 2' across the liquid interface to the thermocouple 20' in the process liquid flow. Thus, the varying signal for $\Delta T_{pl}$ is provided as a second input into the divider circuit means 29. At the same time, the interconnection of the similar metal sides of thermocouple junctions at 31 for thermocouples 14', 15' and 20' is suitable to provide automatic compensation for any temperature variations which might be introduced into the metal piece 2' and to thermocouple junction 20' from the processing liquid flow passing thereover.

It may also be noted in connection with the embodiment of FIG. 2 that a third signal, as a gain factor input, may be provided at terminal Y for the multiplier/divider circuit means 29. In other words, a suitable constant voltage input may be provided as representative of the $k/d$ factor which in turn enters into equation (3) hereinbefore set forth. As a result, there is an output through lines 32 and 33 to voltage indicator means 34 which is responsive to the YZ/X ratio, which in turn is equivalent to the $$\frac{k}{d} \cdot \frac{\Delta T_m}{\Delta T_{pl}},$$

of the heretofore set forth equation (3). The advantage of the present electrical readout system is that a single voltage output at 34 can provide a measure of the two variables in the ratio $$\frac{\Delta T_m}{\Delta T_{pl}}.$$

This output, in turn, can be calibrated for any test apparatus to be indicative of the amount of material buildup on a particular metal surface. Also, as will be obvious to those skilled in the art of measuring fouling, a fouling rate can be determined by measuring differences in the voltage output readings over a period of time such that "rate of fouling" may be determined.

It is again to be pointed out that there is a particular advantage in the present system being able to adapt to all types of metals, whether of a relatively pure type or for alloys which have relatively low temperature coefficients of resistance. Various types of thermocouple means may be used in the system and need not be limited to any one type of thermocouple or one particular type of thermocouple metals. Typically, the type of thermocouple will vary with the temperature levels to be encountered and the mechanical positioning of the particular thermocouple. Various types of constant voltage power supply means may be supplied to the heating coil for the insulated metal piece as well as various types of resistance coils to effect the heating thereof. The nature of the resistance coil and the desired amount of heat therefrom may also vary in accordance with a particular installation in a given processing stream.

The multiplier/divider means indicated in FIG. 2 of the drawing may be of a conventional type and the internal circuitry thereof need not be set forth herein. For example, the multiplier/divider circuit may be similar to that provided within the commercially available Analog Device, Inc. Model AD530 or generally similar to a multiplier/divider as provided by Teledyne Philbrick Models 4454 and 4455. Still other modifications with respect to construction and arrangement in the present improved simplified system, as indicated in both FIG. 1 and FIG. 2, will be obvious to those familiar with these types of measuring systems.

I claim as my invention:

1. Apparatus for measuring the fouling of a metal surface exposed to the flow of a liquid stream by providing for means detecting an electrical signal responsive to the heat transfer taking place from a heated metal piece into a liquid stream passing over one face thereof and for dividing such signal into an electrical signal indicative of the differential temperature through the thickness of the metal piece, which comprises in combination:

a. means for mounting said metal piece to insulate it from ambient conditions while having one surface exposed to said stream;
   b. means for providing a constant heat input into said metal piece;
   c. means for measuring the temperature differential across the depth of said piece and providing an electrical output representative thereof;
   d. means for measuring variations in temperature for the convected heat across the interface between the liquid and the exposed surface of said metal piece and for generating an electrical output therefrom indicative of the temperature being measured;
   e. electrical divider circuit means for receiving the measurements of (c) and (d) and for reading out a resultant electrical signal indicative of changes in the ratio between the metal piece temperature differential and the temperature differential across the interface between the metal piece and the liquid flow to, in turn, provide a measurement of the fouling of the exposed metal surface;
   f. spaced apart thermocouples, positioned to obtain temperature effects from the opposing faces of said metal piece, having leads to similar metal portions of said thermocouples interconnected to thereby provide for a voltage output signal indicative of temperature differential across the depth of said piece; and g. an additional thermocouple means positioned to have a juncture in the liquid stream spaced from the exposed surface of said metal piece to receive convective heat from said surface, there being an interconnection of a lead from the metal forming the thermocouple juncture which is similar to said interconnected similar metal portions of said thermocouple junctures providing the differential temperature through said metal piece, whereby to further provide a voltage signal in turn representative of the convected temperature from said exposed surface of said metal piece.

2. The apparatus of claim 1 further characterized in that a constant voltage input to an electrical resistance coil in contact with said metal piece provides the means for providing a constant heat input into said metal piece.

3. The apparatus of claim 1 still further characterized in that the voltage signal from the differential temperature through the metal piece is provided as one input into the electrical divider circuit means, and the voltage signal from the thermocouple positioned in the fluid stream which provides a voltage signal responsive to convective heat from the surface of the metal piece to the liquid is connected to said divider circuit means as a second input signal and a resulting varying voltage output from the divider circuit means is made connective to voltage reading means to thereby provide a measure of fouling of the exposed metal surface of said metal piece.

4. The apparatus of claim 3 still further characterized in that said voltage reading means is calibrated to give a direct measure of fouling on said metal piece.

* * * * *